(12) United States Patent
Chelaidite

(10) Patent No.: US 11,209,060 B2
(45) Date of Patent: Dec. 28, 2021

(54) ELECTROMECHANICAL BRAKE CALIPER WITH ROLLING FRICTION MOTION CONVERTERS

(71) Applicant: MANDO CORPORATION, Gyeonggi-do (KR)

(72) Inventor: Galus Chelaidite, South Lyon, MI (US)

(73) Assignee: MANDO CORPORATION, Gyeonggi-Do (KR)

( * ) Notice: Subject to any disclaimer, the term of this patent is extended or adjusted under 35 U.S.C. 154(b) by 100 days.

(21) Appl. No.: 16/157,027

(22) Filed: Oct. 10, 2018

(65) Prior Publication Data

US 2019/0331180 A1    Oct. 31, 2019

Related U.S. Application Data

(60) Provisional application No. 62/662,753, filed on Apr. 25, 2018.

(51) Int. Cl.
*F16D 65/18* (2006.01)
*F16H 25/24* (2006.01)
(Continued)

(52) U.S. Cl.
CPC .......... *F16D 65/18* (2013.01); *F16D 55/226* (2013.01); *F16H 25/20* (2013.01); *F16H 25/2204* (2013.01); *F16H 25/24* (2013.01); *F16D 65/38* (2013.01); *F16D 2065/386* (2013.01); *F16D 2121/24* (2013.01); *F16D 2125/40* (2013.01)

(58) Field of Classification Search
CPC .......... F16D 2125/40; F16D 2125/405; F16D 2121/24; F16H 2025/2012; F16H 25/2006; F16H 25/2056; F16H 25/2018; F16H 25/22

See application file for complete search history.

(56) References Cited

U.S. PATENT DOCUMENTS 6,059,076 A     5/2000   Dietrich et al.
8,616,348 B2 *  12/2013  Winkler .................. F16D 65/18
                                                  188/72.8
(Continued)

FOREIGN PATENT DOCUMENTS

DE    102005036863 A1 *  2/2007  ............. F16D 65/18
DE    102011080714 A1 *  12/2012 ............. F16D 65/12
KR    10-1331783         11/2013

OTHER PUBLICATIONS

Machine translation of DE 10 2005 036 863, retrieved Aug. 17, 2020 (Year: 2020).*

*Primary Examiner* — Bradley T King
(74) *Attorney, Agent, or Firm* — Ladas & Parry, LLP

(57) ABSTRACT

Disk brake systems including disk brake systems that are motor actuated are discussed. As a part of these brake systems, various piston assemblies are also discussed, including piston assemblies that include a piston; a spindle; a ball screw assembly within the piston, wherein the spindle forms a lead screw with an interior surface of the ball screw assembly and the ball screw assembly and the lead screw are configured for the lead screw to move linearly followed by the ball screw assembly moving linearly to move the piston upon application of the brake. Additional embodiments of piston assemblies that include ball ramp actuators are also discussed.

20 Claims, 9 Drawing Sheets

(51) Int. Cl.
  *F16H 25/20* (2006.01)
  *F16D 55/226* (2006.01)
  *F16H 25/22* (2006.01)
  *F16D 125/40* (2012.01)
  *F16D 65/38* (2006.01)
  *F16D 121/24* (2012.01)

(56) References Cited

U.S. PATENT DOCUMENTS

| | | | |
|---|---|---|---|
| 2001/0023798 A1* | 9/2001 | Usui | F16D 65/567 |
| | | | 188/72.1 |
| 2003/0102192 A1* | 6/2003 | Kapaan | F16D 65/18 |
| | | | 188/72.7 |
| 2005/0006187 A1* | 1/2005 | Kramer | F16D 65/18 |
| | | | 188/72.8 |
| 2016/0355169 A1* | 12/2016 | Ohlig | B60T 13/741 |
| 2017/0106848 A1* | 4/2017 | Ritter | F16D 65/18 |
| 2018/0087590 A1* | 3/2018 | Chelaidite | F16D 65/183 |

* cited by examiner

ELECTROMECHANICAL BRAKE CALIPER WITH ROLLING FRICTION MOTION CONVERTERS

CROSS-REFERENCE TO RELATED APPLICATIONS

This application claims the benefit of Provisional Application 62/662,753 filed on Apr. 25, 2018, the disclosure of which is incorporated by reference herein in its entirety.

TECHNICAL FIELD

This disclosure relates to brake systems, such as vehicular brake systems, that include a piston for operation of the braking system.

BACKGROUND

Brake systems, such as disk brake systems on vehicles such as cars and trucks, can include caliper housings and one or more pistons within the caliper housings. In operation, the disk brake system can cause brake pads to press against opposite contact surfaces of a brake rotor in order to generate tangential friction force to cause a braking effect. The disk brake system can include a piston which in response to a signal moves against a brake pad to cause a braking effect.

SUMMARY

In a first aspect disclosed herein a piston assembly for a brake is provided. The piston assembly for a brake comprises: a piston having a piston cavity; a spindle; a ball screw assembly located at least partially within the piston cavity, wherein the spindle forms a lead screw with an interior surface of the ball screw assembly and the ball screw assembly and the lead screw are configured for the lead screw to move linearly followed by the ball screw assembly moving linearly to move the piston upon application of the brake.

In a second aspect disclosed herein a method of applying brakes is provided. The method of applying brakes comprises: actuating a brake where the brake system comprises a piston assembly that comprises a piston, the piston having a piston cavity; a spindle; a ball screw assembly located at least partially within the piston cavity, wherein the spindle forms a lead screw with an interior surface of the ball screw assembly and the ball screw assembly and the lead screw are configured for the lead screw to move linearly followed by the ball screw assembly moving linearly to move the piston upon application of the brake; a caliper housing having a piston cylinder with the piston of claim 1 located therein; first and second brake pads positioned in the caliper housing; a brake disk located between the first and second brake pads; and a motor, and the actuating of the brake system comprises rotating the spindle in a first direction, whereby the lead screw turns to move the piston toward the first brake pad, after the piston contacts the first brake pad, the lead screw stops turning and the ball screw assembly begins turning and to push the first brake pad against the disk to create a braking force.

In a third aspect disclosed herein a method of releasing brakes is provided. The method of releasing brakes comprises: rotating the spindle of a brake system in a second direction where the brake system comprises a piston assembly that comprises a piston, the piston having a piston cavity; a spindle; a ball screw assembly located at least partially within the piston cavity, wherein the spindle forms a lead screw with an interior surface of the ball screw assembly and the ball screw assembly and the lead screw are configured for the lead screw to move linearly followed by the ball screw assembly moving linearly to move the piston upon application of the brake; a caliper housing having a piston cylinder with the piston assembly located therein; first and second brake pads positioned in the caliper housing; a brake disk located between the first and second brake pads; and a motor, wherein upon rotation of the spindle in the second direction, the ball screw assembly begins turning and releases force being applied to the first brake pad and moves the piston away from the first brake pad, and after the brake force being applied to the first brake pad is released, the ball screw assembly stops turning and the lead screw begins turning to retract the piston.

In a fourth aspect disclosed herein, a piston assembly for a brake is provided. The piston assembly comprising: a piston having a piston cavity; a spindle; a ball ramp assembly located at least partially within the piston cavity comprising: an upper race comprising a plurality of ball paths; a lower race comprising a plurality of ball paths; and a plurality of balls, wherein each of the ball paths of the upper races corresponds to one of the ball paths of the lower race with a ball located therebetween, and wherein the spindle forms a lead screw with an interior surface of the upper race and the ball ramp actuator and the lead screw are configured for the lead screw to move linearly followed by the ball ramp actuator moving the lower race linearly to move the piston in a direction upon application of the brake.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Operation of many devices, including braking systems for vehicles, can include features for converting rotary motion into linear motion. Embodiments of devices that convert rotary motion to linear motion can include ball screw assemblies and ball ramp assemblies and lead screws. In general, lead screws include features which slide along one another resulting in sliding friction. Ball screw assemblies and ball ramp assemblies can include rolling features, such as ball bearings, upon which relative movement of parts occur, resulting in rolling friction in place of sliding friction. In many embodiments, the rolling friction of the ball screw assemblies and ball ramp assemblies can be significantly lower than the sliding friction of a lead screw.

Ball Screw

Figure 1:
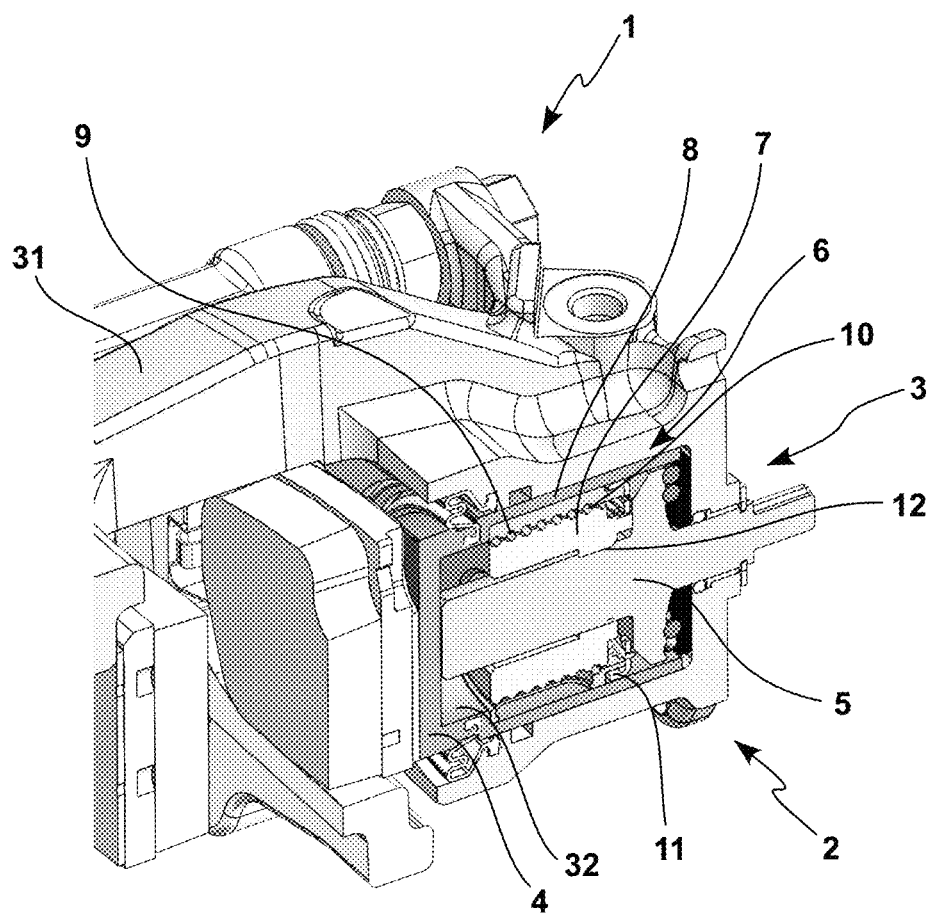
FIG. 1 shows an embodiment of a brake caliper including a cross-sectional view of an embodiment of a brake piston.

FIG. 1 shows of a portion of an embodiment of a brake system 1 showing a portion of a brake caliper 2 including a cross-section of a piston assembly 3. The piston assembly shown in FIG. 1 includes a piston 4, a spindle 5 and a ball screw assembly 6. The ball screw assembly 6 includes a screw shaft 7, a ball nut 8, a plurality of balls 9 and a cap 11 which is fixedly attached to ball nut 8. In some embodiments, ball screw assembly 6 can include a spring 10 configured to provide a pre-load torque between the screw shaft 7 and ball nut 8 through a cap 11. In some embodiments, ball screw assembly 6 can include a spring 10 configured to interact with the screw shaft 7 and ball nut 8 and a cap 11 to assist in positioning the screw shaft 7 in relation to the ball nut 8 when the brakes are released or not engaged. In some embodiments, ball screw assembly 6 can include a spring 10 configured to interact with the screw shaft 7 and ball nut 8 and a cap 11 to assist in positioning the screw shaft 7 in relation to the ball nut 8 when the brakes are released or not engaged by way of a preload torque imparted by the spring 10 between the screw shaft 7 and ball nut 8 through cap 11.

Also shown in FIG. 1 is the lead screw 12 comprising lead screw thread on spindle 13 interfacing with lead screw thread on screw shaft 14.

Figure 2:
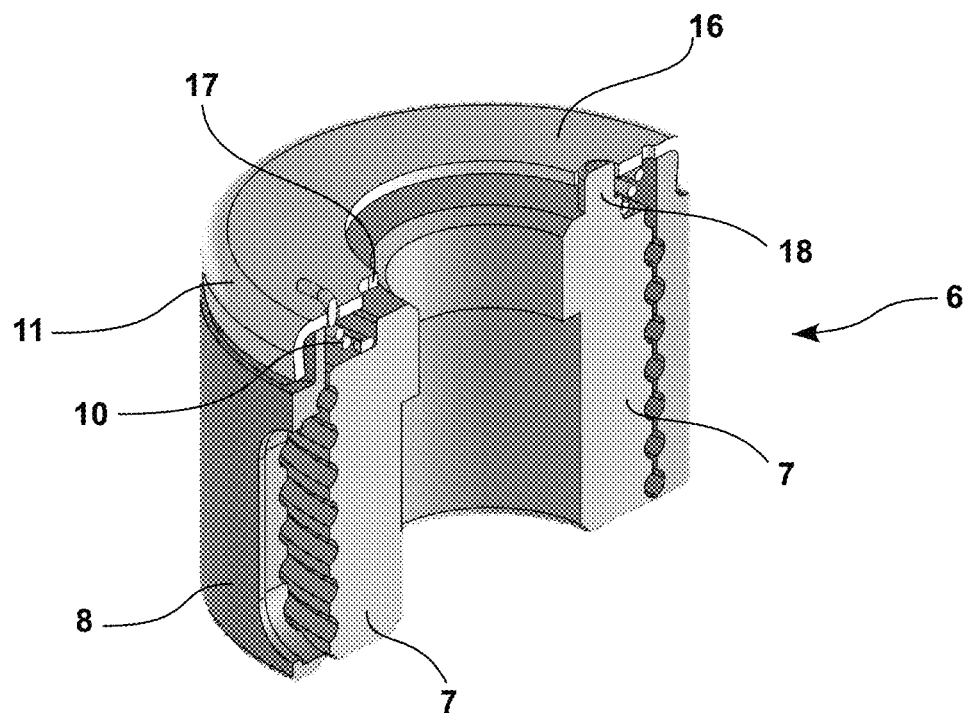
FIG. 2 shows a cross-sectional view of an embodiment of a ball screw assembly for use in a brake piston.
Figure 3:
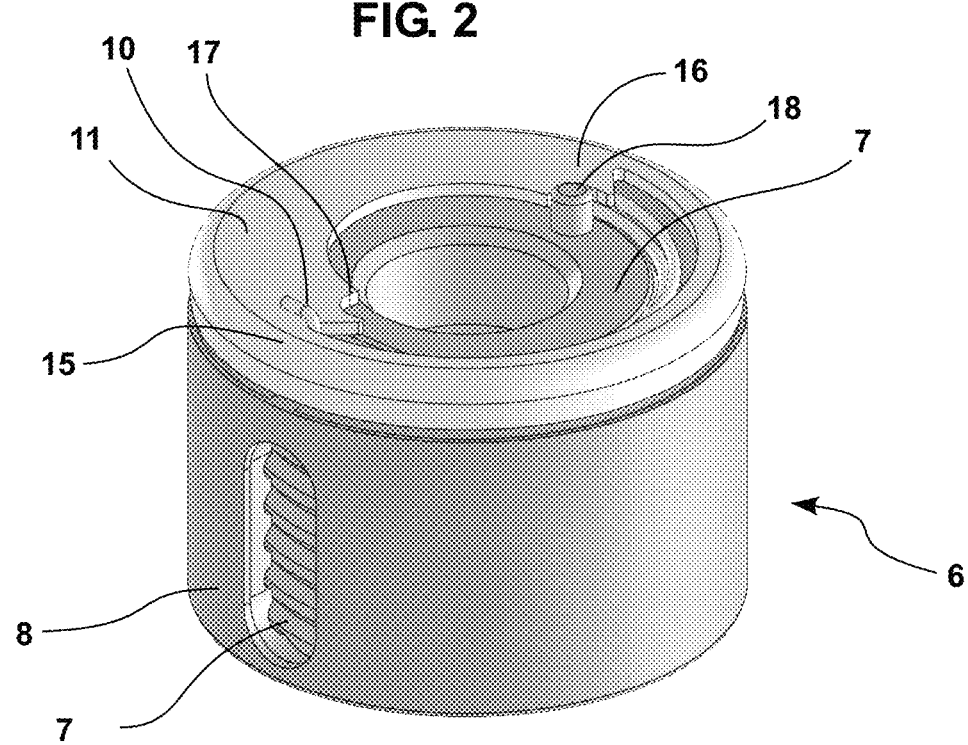
FIG. 3 shows a perspective view of an embodiment of a ball screw assembly for use in a brake piston.

FIG. 3 shows the ball screw 6 assembly of FIG. 1, and FIG. 2 shows a cross-sectional view of the ball screw assembly 6 of FIG. 3. In these figures are shown a screw shaft 7, a ball nut 8, a cap 11 covering a spring 10 and features that can limit the amount of relative rotation between the screw shaft 7 and ball nut 8. FIGS. 2 and 3 show a cap 11 with a spring catch 15 configured for the spring 10 to attach, a first travel stop 16 and a second travel stop 17. In operation, the travel stopper 18 extending from the screw shaft 7 when the brake piston is in the non-actuated position. Upon application of the brakes, and upon rotation of the screw shaft 7 in relation to the ball nut 8, travel stopper 18 will move from the first travel stop 16 along an arc toward the second travel stop 17. The presence of the travel stopper 18, first travel stop 16 and second travel stop 17 provides a limit on the amount of relative rotation of the screw shaft 7 and ball nut 8. While the screw shaft and ball nut are rotated relative to one another, the rotational movement is translated into linear movement along an axis of the ball screw assembly 6 (and spindle 5.) This linear movement in turn results in movement of the piston 4 by way of the ball nut 8 interacting with an interior surface of piston 4. In some embodiments, the ball nut 8 can be located at least partially within a piston cavity 32 and can be affixed by a press fit within the cavity of piston 32 or by a shrink fit within the cavity of piston 32 (such as by cooling the part that fits into the piston cavity 32 or by heating the piston or by a combination of the two). In some embodiments, such as that shown in FIG. 4, there can be a step 19 or other protrusion on the interior of piston 4, such as on a wall of piston cavity 32. Such a step 19 or protrusion can serve as a surface for interaction between the ball nut 8 and piston 4, such as for the ball nut to push on the step or protrusion, or can serve as an assembly aid such as to indicate when the ball nut 8 has been fully inserted into the body 4.

Figure 5:
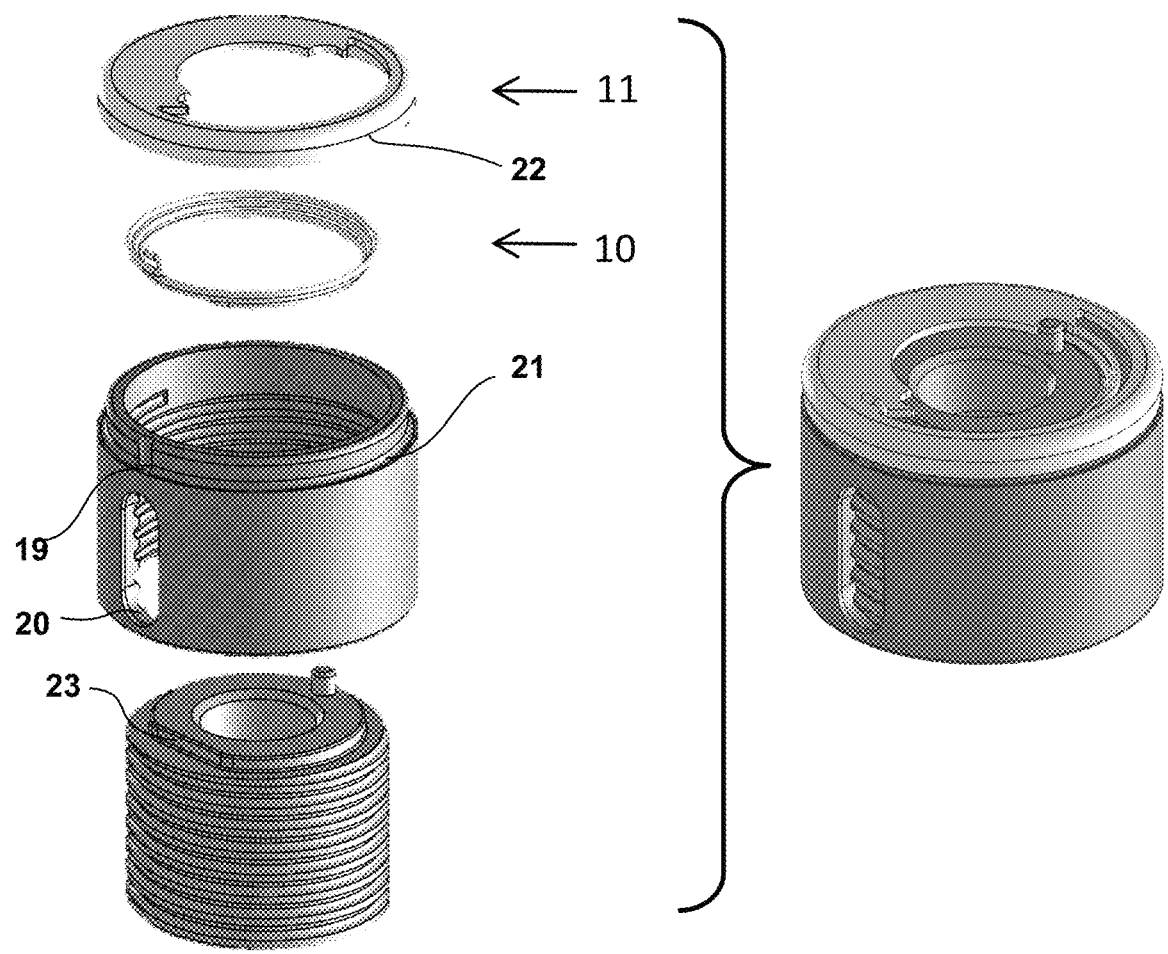
FIG. 5 shows an exploded diagram of an embodiment of the ball screw assembly for use in a brake piston.

FIG. 5 shows an exploded view and an assembled view of ball screw assembly 6. This figure more clearly shows the continuous helical groove on the interior of the ball nut 8, the continuous helical groove on the exterior of the screw shaft 7 wherein the balls 9 of the ball screw assembly 6 travel. When the ball screw assembly is of a recirculating design, one or more recirculation paths can be provided to allow recirculation of the balls. Shown in FIG. 5 is a window 20 which can serve as at least a portion of a recirculation path for recirculation of balls 9 during operation of ball screw assembly 6. In some embodiments, window 20 can be closed, such as by having a cover. In some embodiments, the window 20 can be a groove on the interior of the ball nut 8 that does not go all the way through the ball nut 8. In some embodiments, a non-recirculating ball screw assembly can be used wherein the balls do not recirculate, but can have their position reset by other means, such as by the use of springs acting upon one or more of the balls.

The cap 11 can be anchored to the ball nut 8 to resist the axial movement and rotational movement in relation to the ball nut 8. In one embodiment, the ball nut 8 can include a retention groove 21 configured to receive a lip 22 of cap 11. In various embodiments, retention groove 21 can be tapered or stepped or some other shape or some combination of shapes to provide retention of lip 22 of cap 11. In some embodiments, the lip 22 of cap 11 can be coined into place in the retention groove 21. In some embodiments, an anti-rotation groove 21 can be provided in the ball nut 8 and configured and located to interact with a corresponding protrusion of cap 11 so as to prevent relative rotation after assembly. In some embodiments, cap 11 can be punched or peened or coined at a location corresponding to anti-rotation groove 19, so as to provide a protrusion that corresponds to anti-rotation groove 19 and thereby prevents relative rotation of cap 11 and ball nut 8. In some embodiments, the cap 11 can be fixed in place via interference fit or by welding (e.g. friction or spot welding), brazing, soldering, cementing, gluing or other suitable methods.

As shown in FIG. 5, screw shaft 7 can include a spring retainer 23 on one end of the screw shaft 7 or at some other location on screw shaft 7. FIG. 5 shows the spring retainer 23 as a flattened portion on a stepped region on the end of screw shaft 7. This spring retainer/flattened portion can interact with a portion of the spring to prevent relative rotation of the spring 10 and thus allow the spring 10 to exert torque between the screw shaft 7 and the cap 10 which is affixed to the ball nut 8. When the spring 10 is installed in the ball screw assembly 6, and the ball screw assembly 6 is in the non-actuated position (travel stopper 18 is against the first travel stop 16 or near the first travel stop 16), the spring 10 is in a preload condition, applying torque to resist relative movement of the screw shaft 7 and ball nut 8.

Figure 4:
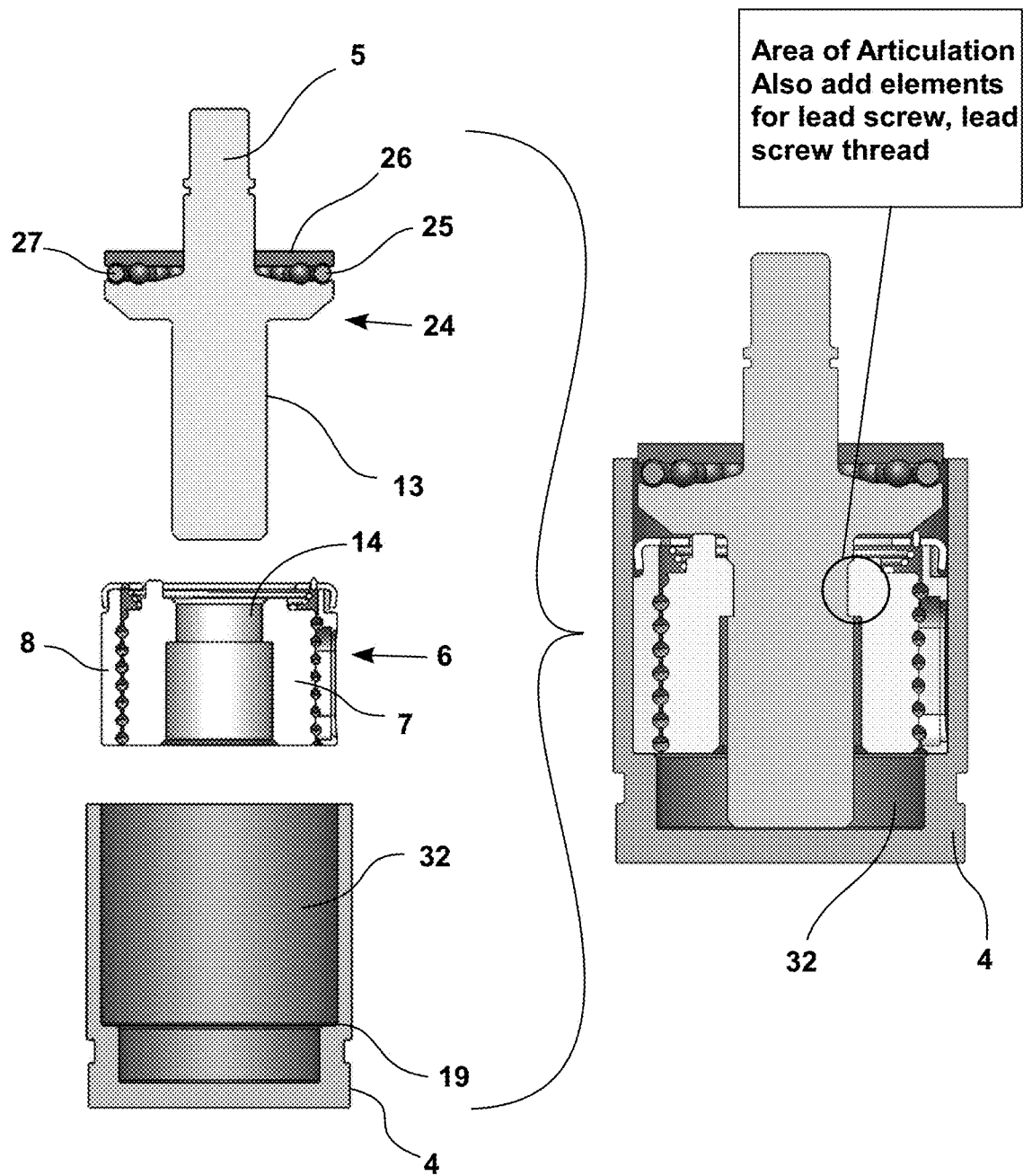
FIG. 4 shows an exploded view of an embodiment of a brake piston including an embodiment of a ball screw.
Figure 7:
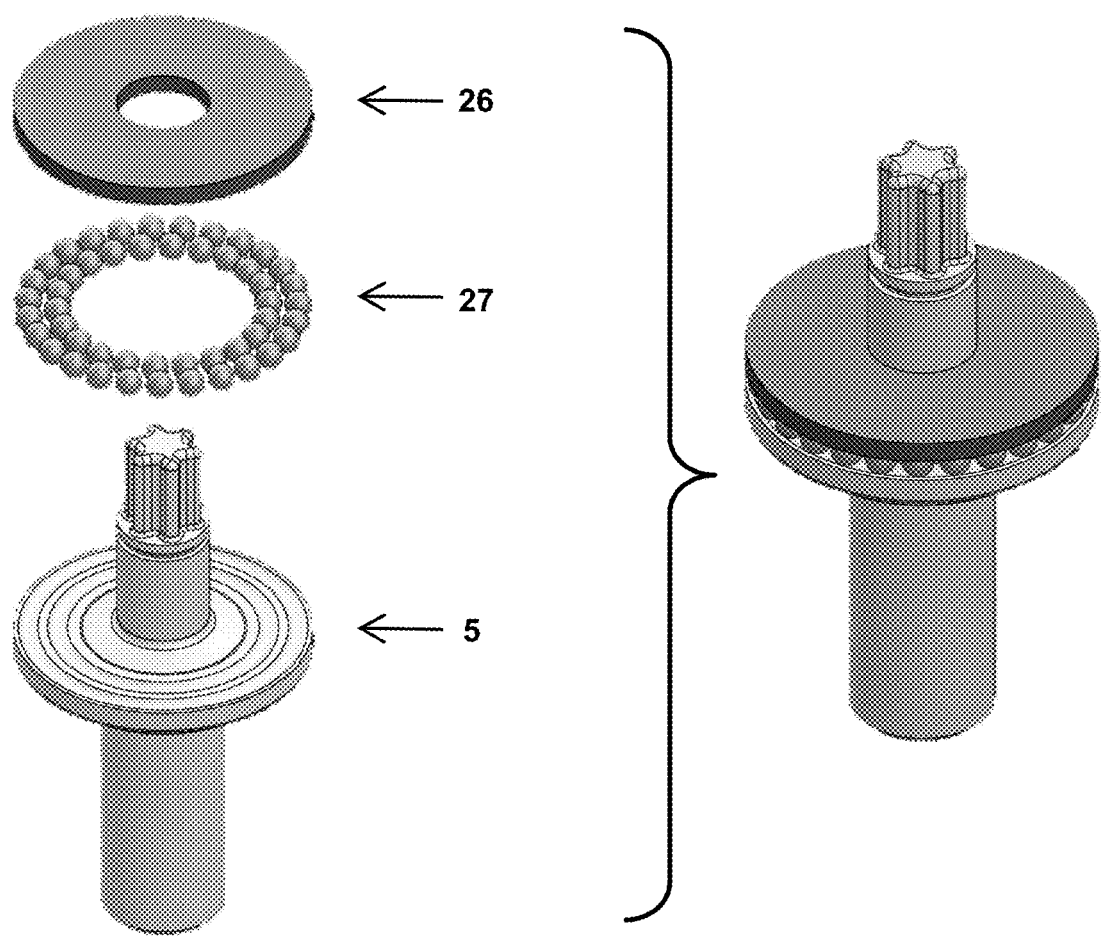
FIG. 7 shows an exploded view of an embodiment of a spindle and thrust bearing.

FIG. 4 also shows a spindle assembly 24 comprising a spindle 5, a thrust bearing 25 and collar 26. In some embodiments, the thrust bearing 25 can be a ball bearing, such as a double row ball bearing having two rows of thrust bearing balls 27, such as is shown in FIG. 7. However, in some embodiments, a single row ball bearing can be used that provides sufficient load area to support the forces involved. When thrust bearing 25 is a ball bearing, in one embodiment, collar 26 can also include an upper race, while a lower race can be present on or built into spindle 5 while in additional embodiments, the upper race and/or the lower race can be present as a separate part, and in some embodiments, the thrust bearing including the balls and the upper and lower race can be provided as a separate sub-assembly.

As previously described, and as shown in FIG. 4, the spindle 5 and the screw shaft 7 can form a lead screw 12, with appropriate thread 13 present on spindle and corresponding thread 14 present on an interior surface of screw shaft 7. In some embodiments, the thread used for the spindle thread 13 and the screw shaft thread 14 can be buttress threads or some other appropriate type of thread used for converting rotational motion into linear motion. In addition, the lead screw 12 threading including the spindle thread 13 and screw shaft thread 14 can be chosen and configured to provide an acceptable range of motion and force profile, including the amount of resistance to turning and the amount of resistance as a function of axial load through the lead screw 12 threading for proper operation of the piston assembly during actuation and release of the brake.

In some embodiments, the thread of the lead screw 12 can be configured to allow for angular articulation of the spindle 5 in relation to the ball screw assembly 6 (which can result in articulation of the spindle in relation to the piston 4), such as to prevent, reduce or relieve non-axial loads on the ball screw assembly which can lead to increased friction or binding within the ball screw assembly and/or excessive wear or early failure of the ball screw assembly. In some embodiments of calipers, during braking operations, uneven loads can be applied to the piston, such as due to uneven wear of a brake pad, a brake disk and/or deflection of the caliper housing from the forces the caliper experiences during braking operations. One embodiment of an area of articulation is shown in FIGS. 4 and 8B. In some embodiments, angular articulation of 2, 4, 6, 8, 10, 12, 15 or 30 degrees can be achieved. In some embodiments, angular articulation of the spindle 5 can be facilitated by the fit between the lead screw threading on the spindle 13 and the lead screw threading on the screw shaft 14, such as by increasing the clearances between the threading on the spindle 13 and the threading on the screw shaft 14 and/or by reducing the number of threads that are engaged at time between the threading on the spindle 13 and the threading on the screw shaft 14. In some embodiments, the threads used for lead screw 12 can be oversized as compared to the threads commonly used for lead screw threads based upon the diameter of the shaft and the thread pitch being used. The oversize characteristic can be exhibited in the space between the threads, the thickness of the threads and/or the height of the threads (distance the threads extend from the shaft.) In some embodiments, less than one complete turn of the thread is engaged, or one complete turn of the thread is engaged, or more than one complete turn of the thread but less than two complete turns of the threads are engaged, or more than two complete turns of the threads are engaged, or one complete turn of the thread is engaged or two complete turns of the threads are engaged. In some embodiments, the lead screw threading on spindle 13 and/or the screw shaft 14 can be tapered or curved to provide clearance for angular articulation. In some embodiments, number of lead screw threads present on the screw shaft 13 can be less than one, one, between one and two, two or more than two complete threads. In some embodiments, the lead screw 12 threads can be configured as a double thread (two helices on each of the spindle and screw shaft, 180° apart.), a triple thread or more.

Operation

Operation of the brake system and the brake piston assembly described herein can include the actuation and release of the brakes by use of a motor to turn the spindle 5.

Figure 6:
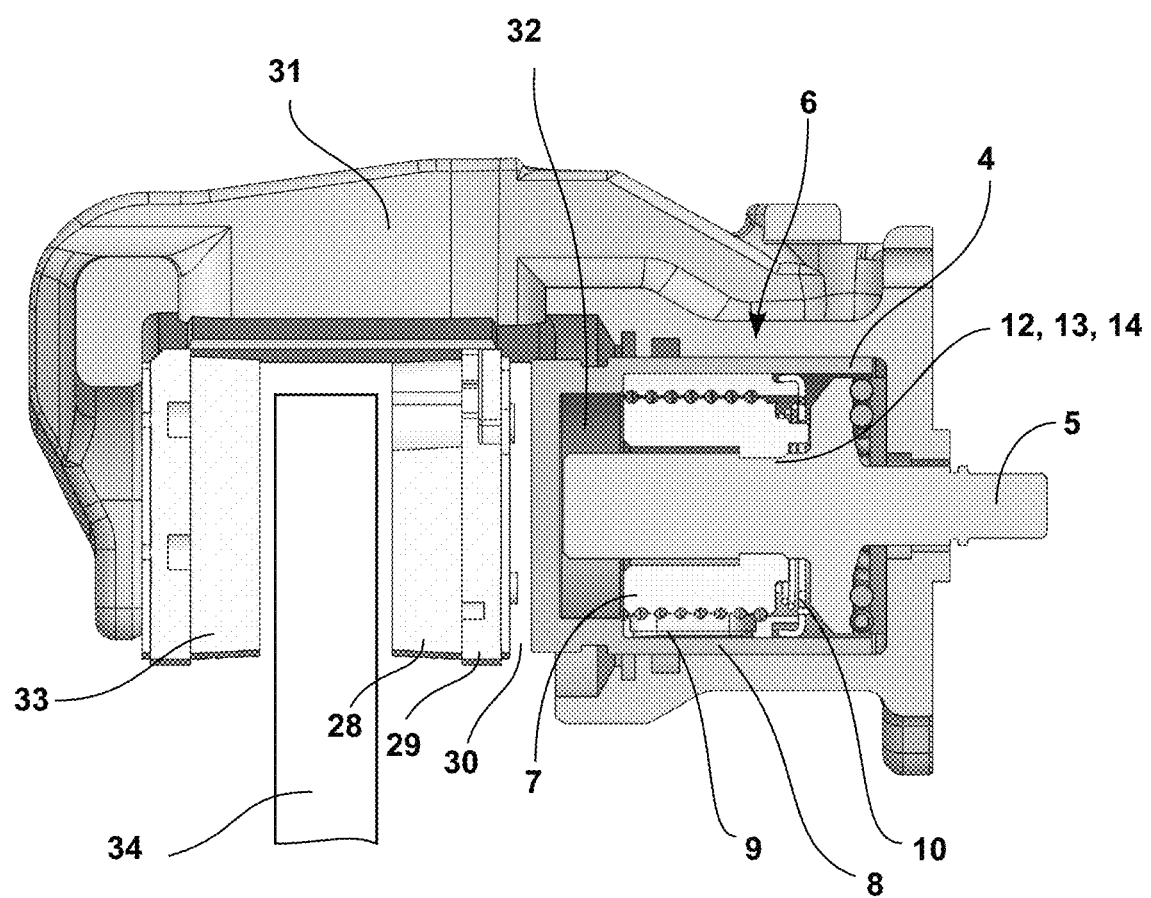
FIG. 6 shows an embodiment of a brake system including an embodiment of a ball screw.

In some embodiments of the brake piston assembly and the brake system described herein, the brakes can be actuated as follows and in reference to FIG. 6. A motor operationally attached to the spindle, turns the spindle in a first direction. In some embodiments, the motor can act on the spindle through a torque modifying device, such as a gearbox. Prior to actuation to apply the brake, the piston 4 can be located such that a gap 30 exists between brake pad backing plate 29 and piston 4. During initial actuation, the axial load exerted by the spindle 5 on the piston 4 through the ball screw assembly 6 is low, but increases when the piston 4 closes gap 30 and contacts brake pad backing plate 29. During actuation, initially the relative rotation of the screw shaft 7 and ball nut 8 of the ball screw assembly 6 is resisted by the pre-load torque of spring 10, and rotation of the ball nut 8 relative to the piston 4 is resisted by the fit of the ball nut 8 within piston cavity 32, resulting in spindle 5 rotating in relation to the screw shaft 7 rather than spindle 5 and screw shaft 7 rotating together. (This pre-load torque can also serve to maintain the position of the ball screw assembly in a retracted position when the brakes are not being applied, and can also serve to or assist in returning the ball screw assembly to a retracted position when the brakes are released.) This relative rotation of the spindle 5 and the screw shaft 7 results in linear motion of the screw shaft 7 toward brake pad 28 by way of lead screw 12 threading between the screw shaft 7 and spindle 5. This linear movement of the screw shaft 7 in turn moves ball nut 8 and piston 4 toward brake pad 28.

When piston 4 contacts brake pad backing plate 29, it forces brake pad 28 against a disc, thus brake pad backing plate 29 imparts a resistive force against piston 4 which force is translated through balls crew 6 back to lead screw 12 threading, increasing the friction torque between spindle threads 13 and screw shaft threads 14. As the force imparted by brake pad backing plate 29 increases, the friction torque within lead screw 12 threading also increases. Eventually, the increase in friction torque between spindle threats 13 and screw shaft threads 14 overcomes the preload torque of spring 10 between the screw shaft 7 and ball nut 8 of balls crew assembly 6, and the screw shaft 7 begins to rotate relative to the ball nut 8 while the screw shaft 7 rotates with spindle 5. Linear motion of piston 4 continues by way of rotation of the ball screw assembly 6 with the screw shaft 7 moving in relation to the ball nut 8 rather than be relative rotation of the spindle 5 and the screw shaft 7. At this point, the piston 4 pushes against the brake pad backing plate 29 to move inner brake pad 28 (and outer brake pad 33) against a brake disk 34 present in the brake system adjacent to brake pad 28. Continued pushing of the piston 4 against brake pad backing plate 29 results in a braking effect through the interaction of the inner brake pad 28 and outer brake pad 33 with the brake disk 34. This arrangement of initial lateral movement via lead screw 12 followed by lateral movement via ball thread utilizes a high friction thread system (a lead screw) with a low axial force present while closing the gap 30 and a low friction thread system (a ball screw) with a high axial force present while forcing the inner brake pad against the brake disk 34 to impart a braking force. Pairing of low friction threads with high forces and high friction threads with low forces facilitates a lower torque actuation system, such as a smaller motor, a lower torque motor and/or a smaller torque converter (e.g. gearbox) and/or lighter weight parts to impart or resist the forces associated with the piston 4.

Release of the brake occurs essentially by reversal of this sequence of events. Rotation of the motor in a second direction, opposite to the first direction, turns the spindle 5 in the second direction. Movement of spindle 5 in the second direction while force is being applied to brake pad backing plate 29 by way of piston 4 results in rotation of ball screw 6 in a direction to retract piston 4 by movement of the screw shaft 7 in relation to the ball nut 8. With retraction of piston 4, the force being applied to piston 4 by brake pad backing plate 29 decreases and eventually 30 between this and body 4 and brake pad backing plate 29 opens. At this point, due to the reduction of force applied to piston 4 by brake pad backing plate 29, the friction present in lead screw 12 threads between spindle threads 13 and screw shaft threads 14 decreases and the tension in spring 10 overcomes the friction in lead screw 12 threads resulting in relative movement of the screw shaft 7 and spindle 5, further retracting piston 4. After a suitable amount of movement of piston 4 away from brake pad backing plate 29, the motor is turned off and rotation stops. In various embodiments, the detection of when to stop the motor can be determined by one or more of such things as motor torque, number of rotations of the motor, motor operating time, etc. The stopping of the motor after a suitable amount of movement of piston 4 away from brake pad backing plate 29 can also accomplish maintaining the adjustment of the brake for wear of the brake pad by controlling the size of gap 30.

Ball Ramp

Figure 8A:
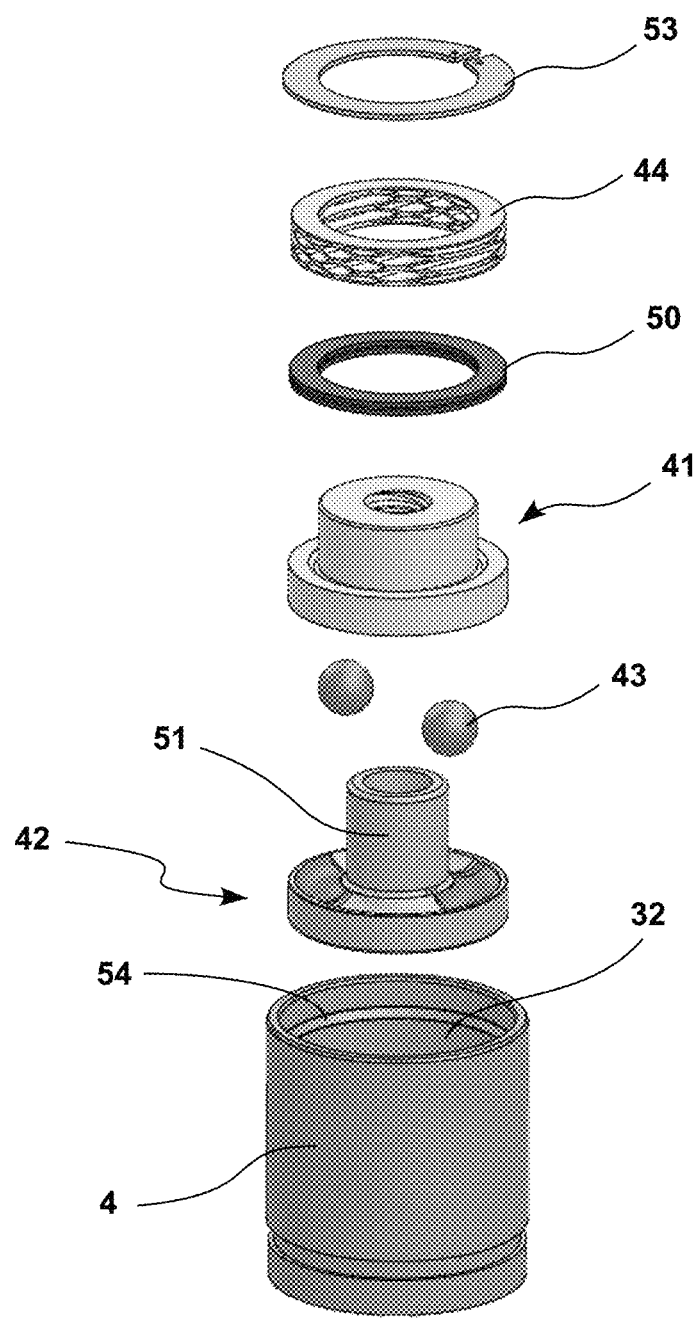
FIG. 8A shows an exploded view of an embodiment of a brake piston including an embodiment of a ball ramp assembly.
Figure 8B:
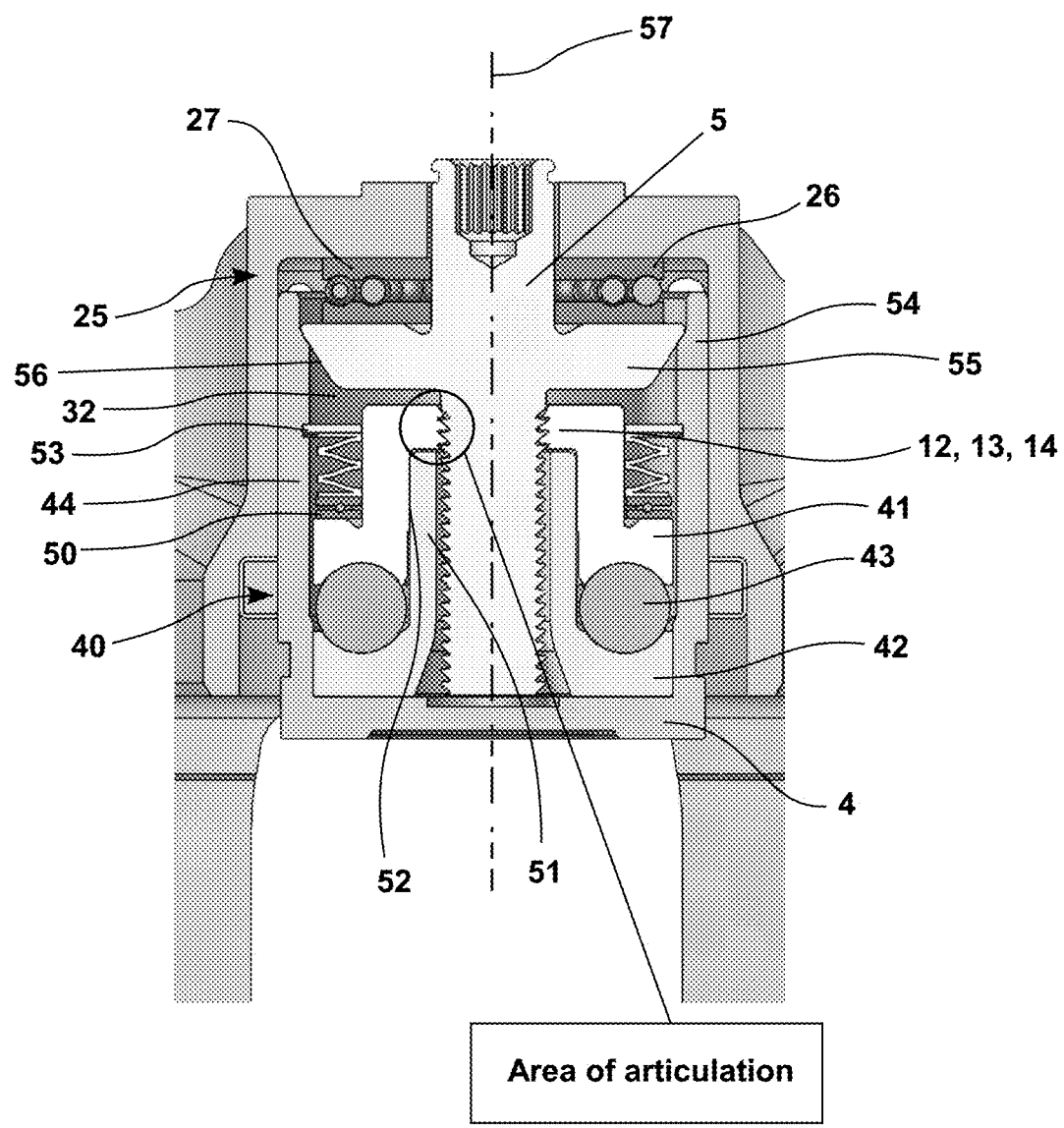
FIG. 8B shows a cross-sectional view of an embodiment of a brake piston including an embodiment of a ball ramp assembly.

Some embodiments of a brake caliper 2 can utilize a ball ramp assembly, such as that shown in FIGS. 8A and 8B. In FIG. 8A, a piston assembly 3 (to keep same number as in ball screw assembly paragraphs) is shown which comprises a piston 4, a ball ramp assembly 40, a low load thrust bearing 50, a compression spring 44 and collar 26. The ball ramp assembly 40 comprises an upper race 41, a lower race 42 and at least two ball bearings 43 located between the upper race 41 and the lower race 42. In some preferred embodiments, the number of ball bearings 43 can be limited to two. The use of only two balls can provide greater room for each ball ramp 47, 48 (see FIG. 9A-D) associated with each ball which in turn can provide a more gradual slope and smoother operation and/or allow for reduced size torque actuation system, such as a smaller motor, a lower torque motor and/or a smallers torque converter (e.g. gearbox) and/or lighter weight parts to impart or resist the forces associated with the piston 4. In order of assembly, the ball ramp assembly 40, the low load thrust bearing 45, the compression spring 44 can be positioned inside the cavity of piston 32. The clip 53 can be positioned in a groove located in the cavity of piston 32, retaining the spring 44, low load thrust bearing 50, upper race 41, ball bearing(s) 43, lower race 42 in the piston cavity 32.

As shown in FIG. 8B, the upper race 41 can form a lead screw 12 with spindle 5. The thrust bearing 25, as discussed above, can comprise a ball bearing such as a ball bearing that in some preferred embodiments can comprise a double row of balls 27. In some embodiments, the upper race 41, lead screw 12, thrust bearing 25 and balls 27 can be located within the caliper housing 31 and the spindle 5 can be located at least partially within the caliper housing 31.

As shown in FIGS. 8A and 8B, lower race 42 can comprise a lower race extension 51 that is received into an upper race recess 52. The lower race extension 51 and upper race recess 52 can be configured to provide lateral and/or rotational stabilization of the upper and lower races 41, 42. In embodiments comprising only two ball bearings 43, the stabilization provided by the lower race extension 51 and upper race recess 52 can help prevent rotational misalignment and/or lateral misalignment of the upper race 41 in relation to the lower race 42, such as might occur due to there only being the two contact surfaces (the two ball bearings 43) on the face of the upper race 41 and the face of the lower race 42.

Figure 9A:
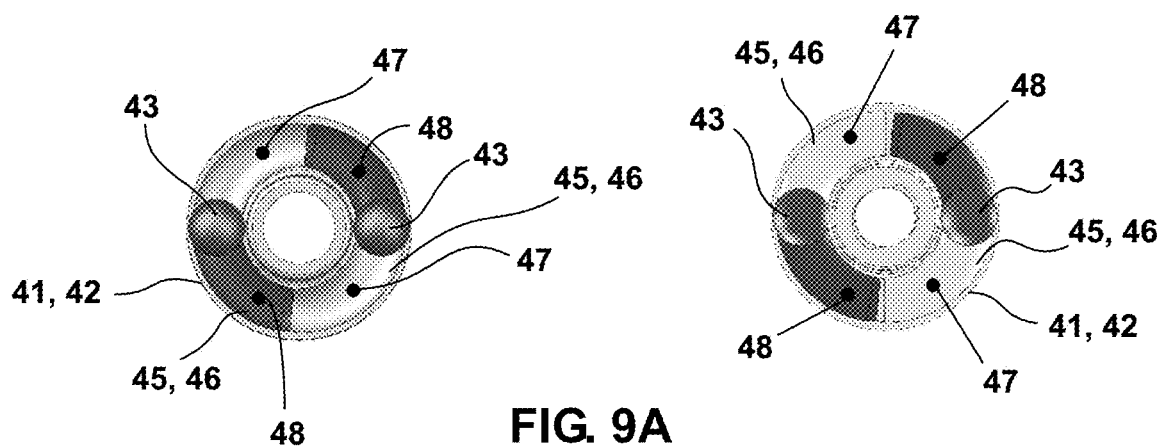
FIG. 9A-C show features and positions of an embodiment of a ball ramp actuator.
Figure 9B:
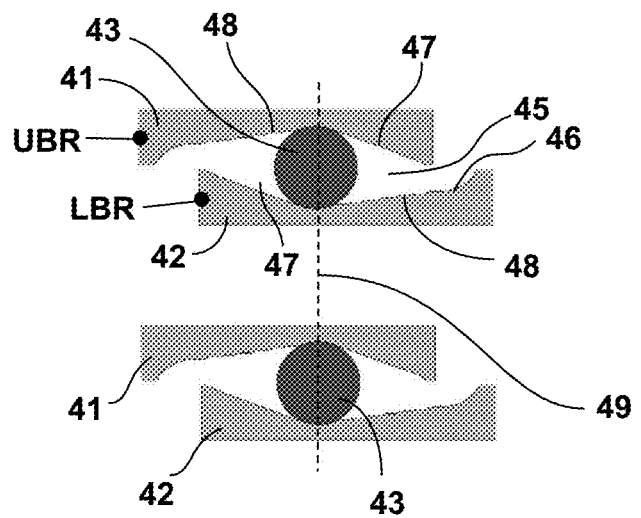
Figure 9C:
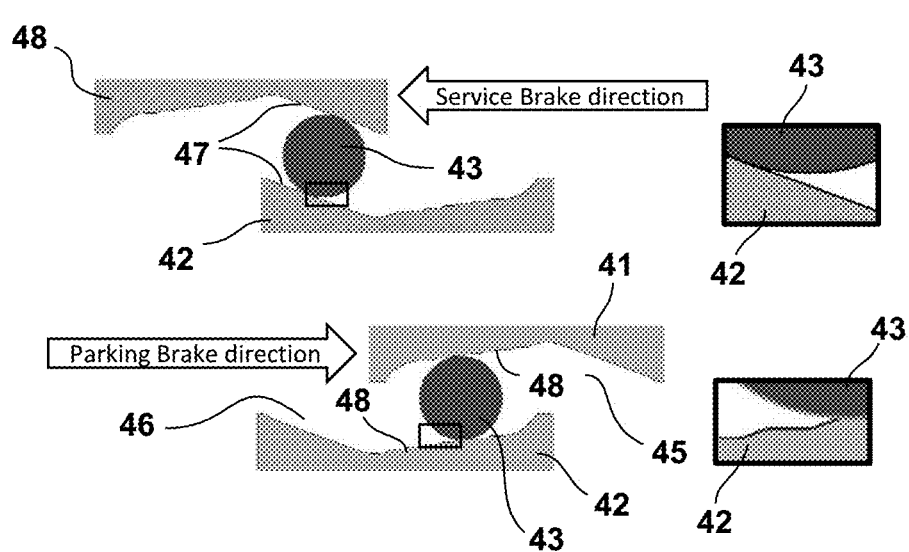

FIGS. 9A-C show various features of an embodiment of a ball ramp assembly 40. FIG. 9A shows an embodiment where two ball bearings 43 are located diametrically opposed to one another within upper race ball path 45 and lower race ball path 46. As shown in FIGS. 9A-C, each of the upper race ball path 45 and lower race ball path 46 have a home position 49 with a service brake ramp 47 extending in one direction from the home position 49 and a parking brake ramp 48 extending in the opposite direction around the circle of the upper race 41/lower race 42. There is a home position 49 for each ball bearing 43. As can be seen in FIG. 9B, one of the ball bearings 43 is contained between the upper race ball path 45 and lower race ball path 46. When the brake is released, each ball bearing 43 is located at the home position 49 between the service brake ramp 47 and parking brake ramp 48 for each of the upper and lower race ball paths. In the home position, the service brake ramp 47 of the upper race ball path 45 is located above the parking brake ramp 48 of the lower race ball path 46, and the parking brake ramp 48 of the upper race ball path 45 is located above the service brake ramp 47 of the lower race ball path 46. (Please note that designation of above, below, left, right, in front of, etc. as used in this disclosure are in reference to how depicted in the particular figure, and the actual orientation of a particular feature in a part in use will depend upon the orientation of that part on a vehicle or elsewhere and can be varied.)

In various embodiments, the ball ramp assembly discussed herein can be combined with the lead screw 12 described above as used with a ball screw assembly, except that a lead screw 12 is formed by the lead screw threads on spindle 5 and the lead screw threads on the upper race 41 as shown in FIG. 8B.

In some embodiments, the thread of the lead screw 12 can be configured to allow for angular articulation of the spindle 5 in relation to the ball ramp assembly 40 (which can result in articulation of the spindle in relation to the piston 4), such as to prevent, reduce or relieve non-axial loads on the ball ramp assembly which can lead to increased friction or binding within the ball ramp assembly and/or excessive wear or early failure of the ball ramp assembly. In some embodiments of calipers, during braking operations, uneven loads can be applied to the piston, such as due to uneven wear of a brake pad, a brake disk and/or deflection of the caliper housing from the forces the caliper experiences during braking operations. One embodiment of an area of articulation is shown in FIG. 8B.

In some embodiments, angular articulation of 2, 4, 6, 8, 10, 12, 15 or 30 degrees can be achieved. In some embodiments, angular articulation of the spindle 5 can be facilitated by the fit between the lead screw threading on the spindle 13 and the lead screw threading on the upper race 41, such as by increasing the clearances between the threading on the spindle 13 and the threading on the upper race 41 and/or by reducing the number of threads that are engaged at time between the threading on the spindle 13 and the threading on the upper race 41. In some embodiments, the threads used for lead screw 12 can be oversized as compared to the threads commonly used for lead screw threads based upon the diameter of the shaft and the thread pitch being used. The oversize characteristic can be exhibited in the space between the threads, the thickness of the threads and/or the height of the threads (distance the threads extend from the shaft.) In some embodiments, less than one complete turn of the thread is engaged, or one complete turn of the thread is engaged, or more than one complete turn of the thread but less than two complete turns of the threads are engaged, or more than two complete turns of the threads are engaged, or one complete turn of the thread is engaged or two complete turns of the threads are engaged. In some embodiments, the lead screw threading on spindle 13 and/or the upper race 41 can be tapered or curved to provide clearance for angular articulation. In some embodiments, number of lead screw threads present on the upper race 41 can be less than one, one, between one and two, two or more than two complete threads. In some embodiments, the lead screw 12 threads can be configured as a double thread (two helices on each of the spindle and screw shaft, 180° apart.), a triple thread or more.

Actuation of the service brake, can occur by rotation of the upper race 41 in a first direction from the home position 49, and actuation of the parking brake can occur by rotation of the upper race 41 in a second direction, the second direction being opposite from the first direction, from home position 49. As can be seen in FIG. 9C, rotation of the upper race 41 in the first direction results in movement of the upper race ball path 45 in relation to the lower race ball path 46 such that the ball bearing 43 trapped therebetween interacts with, by rolling on the service brake ramps 47 of both the upper race ball path 45 and the lower race ball path 46. This interaction with the service brake ramps 47 results in the lower race 42 moving away from the upper race 41 linearly. As can be seen in FIGS. 8A and 8B, this linear movement will result in the lower race 42 pushing against piston 4 and moving piston 4 toward or against brake pad backing plate (not shown in FIG. 8A or 8B.)

As can also be seen in FIG. 9C, rotation of the upper race 41 in the second direction results in movement of the upper race ball path 45 in relation to the lower race ball path 46 such that the ball bearing 43 trapped therebetween interacts, by rolling with parking brake ramps 48 of both upper race ball path 45 and a lower race ball path 46. This interaction with the parking brake ramps 48 results in the lower race 42 moving away from the upper race 41 linearly. As can be seen in FIG. 8, this linear movement will result in the lower race 42 pushing against piston 4 and moving piston 4 toward or against brake pad backing plate (not shown in FIG. 8.)

In some embodiments of service and/or brake ramps 47, 48 in the upper race ball path 45 and/or the lower race ball path 46 can include one or more changes of slope to impart varying resistance to movement of a ball bearing 43 along the ramp, such as where movement along a portion of a ramp having greater slope requires greater force than movement along a portion of a ramp having lesser slope. In some embodiments, the change in slope can be gradual. In some embodiments, the change in slope can occur by steps or can approximate steps. In some embodiments, portions of the ramp can have flat portions (slope is zero or approximately zero) and/or can be negative (resulting in a decrease in the force required to move along the respective portion of the ramp.) In some embodiments, the use of changes in slope over a brake ramp can allow for a holding of a position of the service or parking brake ramp in the upper race ball path in relation to the service or parking brake ramp in the lower race ball path, and therefore the maintenance of a corresponding clamping force on the brake disk 34, while reducing or eliminating the torque imparted through the spindle.

In some preferred embodiments, the service brake ramp 47 in the upper race ball path 45 and the service brake ramp 47 in the lower race ball path 46 can have a constant slope or a continuously increasing slope for the entire length of the service brake ramps 47, while the parking brake ramp 48 in the upper race ball path 45 and the parking brake ramp 48 in the lower race ball path 46 can have a stepped form of a series of positively sloped regions interrupted by flat portions. In some embodiments, when the ball bearing 43 is positioned on a flat portion of the parking brake ramp 48 of the upper race ball path 45, the ball bearing 43 is also positioned on a flat portion of the parking brake ramp 48 of the lower race ball path 46. Such a configuration of flat portions can maintain the clamp force between the inner and outer brake pads on the brake disk, without maintaining torque on the spindle and therefore can result in a parking brake that does not self-release (does not release except with a counter-torque applied by the spindle.)

During operation of the service brake, the spindle 5 is turned, such as by a motor, in the first direction. Initially, the spindle 5 will move in relation to the upper race 41 with the spindle 5 and upper race 41 acting as a lead screw 12 to move the upper race 41, lower race 42 against piston 4. Movement at the ball ramp is precluded at this time due to the preload imposed by preload spring 44 acting between piston 4 and upper race 41 to increase friction within the ball ramp actuator 40. When the piston 4 closes the gap between piston 4 and a corresponding brake pad backing plate, the brake pad backing plate will push against piston 4 which results in increasing the friction torque at lead screw 12 between spindle thread 13 and upper race thread 14. When the friction torque within the lead screw 12 is sufficient and overcomes the preload torque provided by preload spring 44, the upper race 41 of the ball screw actuator will move in relation to the lower race 42, to move piston 4 further and to further apply braking force to the brake pad by way of piston 4 and brake pad backing plate.

During release of the service brake, the sequence of events is essentially reversed with the spindle 5 being moved in the second direction, opposite the first direction, with the ball ramp actuator 40 moving back to the home position 49 and then due to the reduced force applied to piston 4 by brake pad backing plate, the spindle moves in relation to the upper race at lead screw 12. After an appropriate additional rotation of spindle 5, rotation is stopped.

During operation of the parking brake, the spindle is first moved in the first direction, which moves piston 4 in a linear direction toward a corresponding brake pad backing plate by way of lead screw 12. When the piston 4 contacts the brake pad backing plate 29, the opposing force exerted by the brake pad backing plate 29 against the piston 4 increases. Upon sufficient opposing force applied by brake pad backing plate to piston 4, the preload force from spring 44 will be overcome due to the increase in friction in lead screw 12, and the upper race 41 of the ball ramp assembly 40 will begin to rotate in relation to the lower race 42 of the ball ramp assembly with the ball bearings 43 moving along the service brake ramps 47. Restraint of the piston 4 within the caliper housing 31 against rotation and/or linear motion in relation to the caliper housing 31 allows reversal of the direction of rotation of the spindle (rotation in the second direction) and operation of the ball ramp assembly 40 in the opposite direction, where the upper race 41 rotates in relation to the lower race 42 with the ball bearings 43 moving along the service brake ramps 47 (if the ball bearings 43 had moved along the service brake ramps) and along parking brake ramps 48 within the upper and lower race ball paths 45, 46, with further movement of piston 4 resulting in braking effect between the inner and outer brake pads 28, 33 and brake disk 34. Rotation of the ball ramp assembly in the second direction (with the ball bearings 43 moving along the parking brake ramps 48 to engage the parking brake can be facilitated by restricting movement of the piston 4 (laterally or rotationally) within the caliper housing 31 by placing the lead screw 12 under sufficient load that the torque to loosen the lead screw 12 (rotation in the second direction which would move the piston 4 away from the brake pad 28) is greater than the torque to rotate the ball ramp on the parking brake ramp 48. In some embodiments, restricting movement of the piston 4 (laterally and/or rotationally) can be accomplished by, for example, features that include one or more solenoids and/or voice coil actuators.

During release of the parking brake, the sequence of events is essentially reversed with the spindle 5 moving in the first direction, causing the upper race ball path 45 to move in relation to the lower race ball path 46 back to the home position 49. At this point, the force imparted by the brake pad backing plate to the piston 4 and from the piston 4 through the ball ramp actuator 42 lead screw 12 is reduced, reducing the friction at lead screw 12. Rotation of spindle 5 then continues in the second direction causing the upper race 41 to retract by action of lead screw 12, pulling piston 4 away from brake pad backing plate through preload spring 44. After sufficient rotation of spindle 5, rotation is stopped.

Also shown in FIGS. 8A and 8B is a spindle stop 54 on the wall of an embodiment of a piston cavity 32. In various embodiments, a spindle stop can be provided within a brake piston assembly in order to facilitate activities that are assisted by retracting the piston 4 into the caliper housing 31, such as removal or installation of a caliper 2 into a vehicle or installation, removal or replacement of one or more brake pad in a caliper housing. Use of a spindle stop can include operation of the brake to retract the piston 4 into the caliper housing 31 until the spindle stop is contacted by a portion of the spindle 5, such as a flange 55 as shown in FIG. 8B which extends outward away from the rotational axis of the spindle 5. In some embodiments, the spindle stop can extend from a wall of the piston cavity 32 toward the rotational axis 57 of the spindle 5, such as is shown in FIG. 8b. In some embodiments, the flange contact surface 56 can be configured such that the normal force exerted by the spindle stop 54 against the flange contact surface 56 can form an angle with the axis of rotation 57 of the spindle 5 of less than or equal to 80, or 70 or 60 or 50 or 40 or 30 or 20 or 10 or 5 degrees in order to help prevent binding of the spindle 5 against the spindle stop 54 and facilitate rotation of the spindle to extend the piston 4 out of the caliper housing 31 and move the spindle flange 55 away from the spindle stop 54.

Spindle stop 54 can be a sloped step configured to interact with a sloped portion of the spindle 5 and limit the travel of piston 4 in relation to spindle 5. Operation of spindle 5 in the second direction retracts piston 4 into the caliper housing until a spindle flange 55 on spindle 5 contacts spindle stop 54 and prevents further retraction of spindle 5. In some embodiments, the sloped shape of spindle stop 54 is configured to interact with a sloped shape of spindle extension 55 such that the spindle flange 55 can later be moved away from spindle stop 54 by rotation of spindle 5 in the first direction without the need for excessive torque. In some suitable embodiments, the shape of the sloped shape of spindle flange 55 can be conical or curved and the sloped shape of spindle stop 54 can be conical, curved or a step. In some embodiments, the contacting surfaces of the spindle stop 54 and the flange 55 can be configured such that the direction of force (the vector sum of the normal forces and the frictional forces) at engagement is parallel to the axis of rotation of spindle 5 or up to 60 degrees from parallel to the axis of rotation of spindle 5. In various embodiments, retraction of the spindle 5 such that spindle flange 55 rests against spindle stop 54 can be utilized for brake repair or maintenance or inspection, such as for brake pad removal and/or installation, or for installation of the caliper in a vehicle.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. Use of language such as "approximately", "somewhat", "about", "nearly" and other terms of degree that appear within this disclosure are intended to be interpreted as a person of skill in the art would understand the language based upon the context, with a further understanding that if the context provides insufficient guidance, a tolerance of 20% should be applied.

I claim:

1. A piston assembly for a brake comprising:
   a piston having a piston cavity;
   a spindle configured to be rotatable;
   a ball screw assembly located at least partially within the piston cavity, the ball screw assembly comprising a screw shaft screw-coupled with the spindle and a ball nut operably coupled with the screw shaft through balls; and
   a torsion spring configured to provide a preload torque between the screw shaft and the ball nut of the ball screw assembly to resist relative rotation of the screw shaft of the ball screw assembly with respect to the ball nut of the ball screw assembly so that the screw shaft and the ball nut of the ball screw assembly are linearly movable in response to rotation of the spindle, wherein the screw shaft of the ball screw assembly is relatively rotatable with respect to the ball nut of the ball screw assembly in response to the rotation of the spindle when a torque applied to the torsion spring overcomes the preload torque of the torsion spring, wherein clearance is provided between a screwed-coupled portion of the spindle screwed-coupled with the screw shaft and a screwed-coupled portion of the screw shaft screw-coupled with the spindle so that an axis of the spindle is angularly articulatable in a direction perpendicular to an axis of the screw shaft of the ball screw assembly.

2. The piston assembly of claim 1, wherein the torsion spring is configured to delay the relative rotation of the screw shaft and the ball nut of the ball screw assembly upon the rotation of the spindle in relation to the piston upon application of the brake.

3. The piston assembly of claim 1 further comprising a thrust bearing configured to transfer force from the spindle to a caliper housing.

4. The piston assembly of claim 1, wherein an interior surface of the screw shaft has less than two threads of engagement with the spindle.

5. The piston assembly of claim 1, wherein the torque applied to the torsion spring includes a friction torque between the spindle and the screw shaft of the ball screw assembly.

6. The piston assembly of claim 1, wherein the torsion spring is disposed between the screw shaft of the ball screw assembly and a cap of the ball nut of the ball screw assembly.

7. The piston assembly of claim 1, wherein one end of the torsion spring is coupled with a cap of the ball nut of the ball screw assembly and another end of the torsion spring is coupled with the screw shaft of the ball screw assembly.

8. The piston assembly of claim 1, wherein the screw shaft comprises a travel stop operably associated with the one or more stops to limit the rotatable amount of the relative rotation of the screw shaft with respect to the ball nut.

9. The piston assembly of claim 8, wherein the one or more stops are included in the ball nut or a cap fixed to the ball nut of the ball screw assembly and the travel stop is included in the screw shaft of the ball screw assembly.

10. The piston assembly of claim 1, wherein an interior surface of the screw shaft of the ball screw assembly has a first surface facing and spaced apart from an exterior surface of the spindle and a second surface screwed-coupled with the spindle.

11. The piston assembly of claim 10, wherein an inner diameter of the first surface of the screw shaft of the ball screw assembly spaced apart from the exterior surface of the spindle is greater than an inner diameter of the second surface of the screw shaft of the ball screw assembly screw-coupled with the spindle.

12. The piston assembly of claim 1, wherein the torsion spring and at least a part of the screw shaft are positioned inside an inner space of the ball nut formed by an inside surface of the ball nut.

13. The piston assembly of claim 1, further comprising:
two stops configured to limit a rotatable amount of the relative rotation of the screw shaft of the ball screw assembly with respect to the ball nut of the ball screw assembly; and
a travel stop configured to be movable between the two stops and operably associated with the two stops to limit the rotatable amount of the relative rotation of the screw shaft with respect to the ball nut.

14. A brake system comprising:
the piston assembly of claim 1;
a caliper housing having a piston cylinder with the piston assembly located at least partially therein;
first and second brake pads positioned in the caliper housing;
a brake disk located between the first and second brake pads; and
a motor.

15. The brake system of claim 14, wherein the motor is in operational communication with the spindle and turns the spindle to apply and release the brake.

16. The brake system of claim 15, wherein the motor is connected to the spindle through a gear box.

17. A method of applying brakes comprising:
actuating the brake system of claim 14 comprising rotating the spindle in a first direction, whereby the screw shaft and the ball nut of the ball screw assembly begin linearly moving to move the piston toward the first brake pad, and after the piston contacts the first brake pad, the screw shaft of the ball screw assembly begins turning to push the first brake pad against the brake disk to create a braking force.

18. A method of releasing brakes comprising:
rotating the spindle of the brake system of claim 14 in a second direction, whereby the screw shaft of the ball screw assembly begins turning and releases force being applied to the first brake pad and moves the piston away from the first brake pad, and after the brake force being applied to the first brake pad is released, the screw shaft of the ball screw assembly stops turning and the screw shaft and ball nut of the ball screw assembly begin linearly moving to retract the piston.

19. A piston assembly for a brake comprising:
a piston having a piston cavity;
a spindle configured to be rotatable;
a ball screw assembly located at least partially within the piston cavity, the ball screw assembly comprising a screw shaft screw-coupled with the spindle and a ball nut operably coupled with the screw shaft through balls; and
a torsion spring configured to resist relative rotation of the screw shaft with respect to the ball nut so that the screw shaft and the ball nut of the ball screw assembly are linearly movable in response to rotation of the spindle before the piston contacts a brake pad, and the screw shaft of the ball screw assembly is relatively rotatable with respect to the ball nut of the ball screw assembly and the ball nut of the ball screw assembly is linearly movable in response to rotation of the screw shaft of the ball screw assembly after the piston contacts the brake pad,
wherein clearance is provided between a screwed-coupled portion of the spindle screwed-coupled with the screw shaft and a screwed-coupled portion of the screw shaft screw-coupled with the spindle so that an axis of the spindle is angularly articulatable in a direction perpendicular to an axis of the screw shaft of the ball screw assembly.

20. A piston assembly for a brake comprising:
a piston having a piston cavity;
a spindle configured to be rotatable; and
a ball screw assembly located at least partially within the piston cavity, the ball screw assembly comprising a screw shaft screw-coupled with the spindle and a ball nut operably coupled with the screw shaft through balls, wherein an interior surface of the screw shaft of the ball screw assembly has a first surface facing and spaced apart from an exterior surface of the spindle and a second surface screwed-coupled with the spindle, an inner diameter of the first surface of the screw shaft of the ball screw assembly greater than an inner diameter of the second surface of the screw shaft of the ball screw assembly, and wherein clearance is provided between a screwed-coupled portion of the spindle screwed-coupled with the screw shaft and a screwed-coupled portion of the screw shaft screw-coupled with the spindle so that an axis of the spindle is angularly articulatable in a direction perpendicular to an axis of the screw shaft of the ball screw assembly.

\* \* \* \* \*